United States Patent
Briongos et al.

(10) Patent No.: US 12,277,226 B2
(45) Date of Patent: Apr. 15, 2025

(54) PATCHING ENCLAVES WITH SHARED RESOURCES

(71) Applicant: NEC Laboratories Europe GmbH, Heidelberg (DE)

(72) Inventors: Samira Briongos, Heidelberg (DE); Felix Klaedtke, Heidelberg (DE)

(73) Assignee: NEC CORPORATION, Tokyo (JP)

(*) Notice: Subject to any disclaimer, the term of this patent is extended or adjusted under 35 U.S.C. 154(b) by 214 days.

(21) Appl. No.: 17/966,918

(22) Filed: Oct. 17, 2022

(65) Prior Publication Data
US 2024/0061938 A1   Feb. 22, 2024

Related U.S. Application Data

(60) Provisional application No. 63/398,905, filed on Aug. 18, 2022.

(51) Int. Cl.
*G06F 21/57*   (2013.01)
*G06F 8/61*    (2018.01)
*G06F 8/65*    (2018.01)

(52) U.S. Cl.
CPC .............. *G06F 21/572* (2013.01); *G06F 8/61* (2013.01); *G06F 8/65* (2013.01); *G06F 2221/033* (2013.01)

(58) Field of Classification Search
CPC ........................................................ G06F 8/61
See application file for complete search history.

(56) References Cited

U.S. PATENT DOCUMENTS

| | | | |
|---|---|---|---|
| 2021/0224061 A1* | 7/2021 | Pillilli | G06F 9/4403 |
| 2022/0113960 A1* | 4/2022 | Moran | G06F 8/658 |
| 2022/0414224 A1* | 12/2022 | Sachdeva | G06F 21/77 |
| 2023/0269093 A1* | 8/2023 | Ben-Ari | H04L 63/126 |
| | | | 713/175 |
| 2023/0281299 A1* | 9/2023 | Hussmann | G06F 21/53 |
| | | | 726/18 |

OTHER PUBLICATIONS

Lee, Dayeol et al.; "Keystone: An Open Framework for Architecting Trusted Execution Environments"; *Fifteenth European Conference on Computer Systems* (*EuroSys* '20); Apr. 27-30, 2020, Heraklion, Greece; pp. 1-16; ISBN 978-1-4503-6882-7; ACM Publications; New York, NY, USA.

(Continued)

*Primary Examiner* — Clayton R Williams
(74) *Attorney, Agent, or Firm* — Leydig, Voit & Mayer, Ltd.

(57) ABSTRACT

A method for implementing a software update for a selected enclave of a computing system includes obtaining, by a security monitor (SM) of the computing system, the software update for the selected enclave, installing, by the SM, the software update for the selected enclave to provide updated enclave software code, and measuring, by the SM, the updated enclave software code to provide a software update measurement. The updated enclave software code is stored in a memory region isolated from a memory region in which data for the selected enclave is stored. The method further includes transmitting, by the SM, the software update measurement to one or more respective other enclaves that share a memory region with the selected enclave.

19 Claims, 9 Drawing Sheets

(56) References Cited

OTHER PUBLICATIONS

Yu, Jason Zhijingcheng et al.; "Elasticlave: An Efficient Memory Model for Enclaves"; *Proceedings of the 31st USENIX Security Symposium 2022*; Aug. 10-12, 2022, Boston, MA, USA; pp. 4111-4128; ISBN 978-1-939133-31-1; USENIX Association; Berkeley, CA, USA.
Percival, Colin; *"Matching with Mismatches and Assorted Applications"*; Dec. 2006; pp. 1-82; [Online] Retrieved from internet: https://www.daemonology.net/papers/thesis.pdf; University of Oxford; Oxford, UK.
Iulian Neamtiu, Michael Hicks et al.; "Practical Dynamic Software Updating for C"; *PLDI'06*, Jun. 11-14, 2006; Ottawa, Ontario, Canada; pp. 1-13; ISBN 978-1-59593-320-4; ACM Publications; New York, NY, USA.
Hayden, Christopher M. et al.; "Kitsune: Efficient, General-Purpose Dynamic Software Updating for C"; ACM Transactions on Programming Languages and Systems; Oct. 2014; pp. 1-38; vol. 36, No. 4, Art. 13; ACM Publications; New York, NY, USA.
Makris, Kristis et al.; "Immediate Multi-Threaded Dynamic Software Updates Using Stack Reconstruction"; *2009 USENIX Annual Technical Conference*; Jun. 14-19, 2009; San Diego, CA, USA; pp. 1-14; USENIX Association; Berkeley, CA, USA.

\* cited by examiner

```
{
  "hash_old": "3897fe061e7b4d0d4cad95bb526d3333b8b3699f790b7adb09e39e64b2fdaf0",
  "hash_new": "9b06987f4c2e576e91523-9d07f22614f6bd6e9e2de8cf0b95673b975daf3ee",
  "version_old": "1.8.14",
  "version_new": "1.8.15",
  "timestamp": "2022-08-01T08:15:00-07:00",
  "platform_id": "HDYODmcj35Djao...78Hjkfh3",
  "owner_id": "AAAAB3NzaC1yc2E...jPcGG2k",
}
```

FIG. 6

PATCHING ENCLAVES WITH SHARED RESOURCES

CROSS-REFERENCE TO RELATED APPLICATION

Priority is claimed to U.S. Provisional Patent Application No. 63/398,905, filed on Aug. 18, 2022, the entire disclosure of which is hereby incorporated by reference herein.

FIELD

The present disclosure relates to a method, system and computer-readable medium for patching enclaves with shared resources.

BACKGROUND

Trusted execution environments (TEEs)—often also called enclaves—are nowadays widely adopted in cloud deployments for protecting their components that process sensitive data. TEEs are hardware-supported shielded containers for applications executing inside them, ensuring isolation from the rest of the software stack and even preventing privileged software like the operating system (OS) from accessing and manipulating the applications' code, data, and runtime state.

Many computer processing unit (CPU) platforms and manufactures support TEEs. Intel's Software Guard eXtensions (SGX) is one of its most prominent instantiations of TEE for Intel x86 CPUs. Similarly, ARM CPUs have TrustZone, and AMD designed the Secure Encrypted Virtualization (SEV) system on top of its Platform Security Processor (PSP). The open Instruction Set Architecture (ISA) Reduced Instruction Set Computer (RISC)-V also provides hardware support for the implementation of TEEs. Here, a security monitor (SM) runs in the most privileged mode and ensures, with special hardware support, e.g., memory isolation between enclaves and untrusted applications (including the operating system). Keystone [D. Lee, D. Kohlbrenner, S. Shinde, K. Asanović, and D. Song: "Keystone: An Open Framework for Architecting Trusted Execution Environments", EuroSys 2020—the entire contents of which is hereby incorporated by reference herein] is one such implementation of a security monitor.

Although applications that run in enclaves are often well tested, sometimes even formally verified, it might still be necessary to patch or update them from time to time. For instance, a patch to a security critical bug or a requested and newly implemented feature make it necessary to update the enclave code. Note that another entity, e.g., another enclave that interacts with the enclave may have even requested the code update, e.g., because the other enclave considers the security bug as severe or the new feature is required to properly process shared data between the enclaves.

Saving the enclave's state, installing the new code or patch, restarting the enclave, and reloading the state results in a huge downtime (in the range of seconds) of the service offered by the enclave. Additional mechanisms are also necessary to prevent replay and rollback attacks when reloading the enclave's state. Furthermore, the enclave identity has changed, i.e., the update process has essentially created a new enclave (after terminating another one). Secure channels with the updated enclave must be reestablished. Generally, other enclaves that interact with the enclave may require some sort of attestation that the update has indeed been performed before continuing the collaboration, e.g., by continuing sharing sensitive data with the enclave.

Weichbrodt et al. [N. Weichbrodt, J. Heinemann, L. Almstedt, P.-L. Aublin, and R. Kapitza: "sgx-dl: Dynamic Loading and Hot-Patching for Secure Applications", Middleware 2021—the entire contents of which is hereby incorporated by reference herein] have recently described a method to install new and update code for Intel SGX enclaves. The method is based on dynamically linking libraries to enclave code, which can be realized by using new capabilities of SGXv2. First, the method has the drawback that only dynamic updates to the dynamically linked libraries are possible. The core code of the enclave cannot be dynamically updated. Second, the method falls short in thoroughly attesting the code updates. Concretely, the enclave itself computes a hash of the functions from the dynamically linked libraries. Consequently, when attesting the enclave one must also trust the enclave in addition to the measurement of the preinstalled quoting enclave and an additional protocol is necessary for attesting the library measurement. Note that the measurement of the quoting enclave comprise the enclave's core code but not the dynamically loaded libraries. Furthermore, the method is specific to Intel CPUs with SGXv2 and not suitable for SGXv1.

SUMMARY

An aspect of the present disclosure provides a method for implementing a software update for a selected enclave of a computing system. The method includes obtaining, by a security monitor (SM) of the computing system, the software update for the selected enclave, installing, by the SM, the software update for the selected enclave to provide updated enclave software code, and measuring, by the SM, the updated enclave software code to provide a software update measurement. The updated enclave software code is stored in a memory region isolated from a memory region in which data for the selected enclave is stored. The method further includes transmitting, by the SM, the software update measurement to one or more respective other enclaves that share a memory region with the selected enclave.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 6 illustrates an example of meta-data attached to a binary patch that is packaged as a software update;

DETAILED DESCRIPTION

Figure 1:
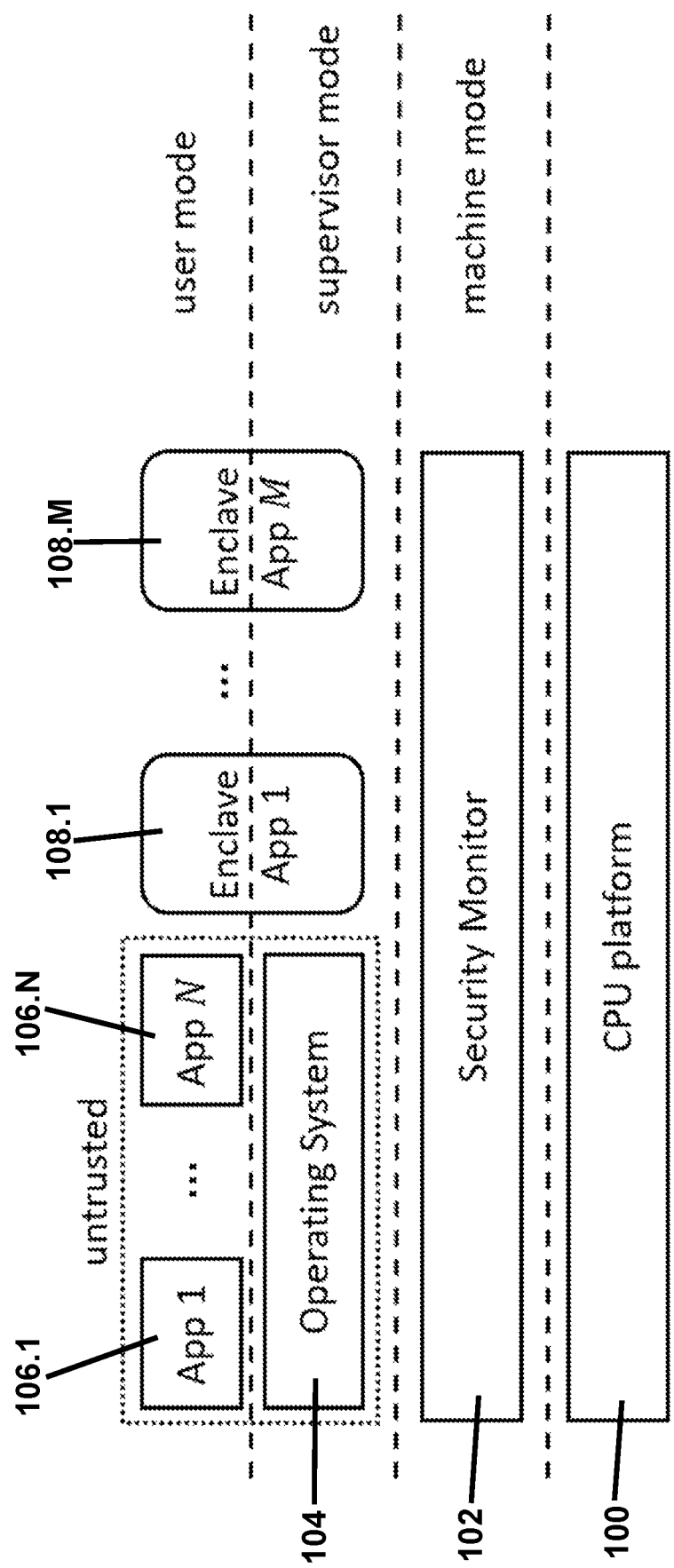
FIG. 1 illustrates system architecture in which aspects of the present disclosure may be implemented.

According to an aspect of the present disclosure, a method is provided that (a) dynamically updates enclave code and (b) informs other enclaves about the updates. Dynamically updating enclave code reduces the downtime of enclaves and avoids the need to store and load an enclave's internal state. Informing other enclaves of the updates is particularly relevant to maintain trust in environments where multiple enclaves interact and share sensitive data. Note that, from a software architectural perspective, it is desirable to have critical components composed of multiple small, interacting services—each thoroughly analyzed, tested, and possibly even verified—which are protected by being run it in their own protected environments.

The present disclosure provides methods, computer readable media, and systems that provide for:
1) separating enclave measurement into code (executable) measurement and data (state) measurement, where enclave code is write protected and only a trusted entity (namely, the SM) can modify it;
2) controlling access to shared resources (memory) by locks that are managed by a trusted entity (namely, the security monitor (SM)); and
3) notifying enclaves about code updates and protecting shared resources (memory) until code updates are acknowledged.

In this manner, the present disclosure provides techniques for facilitating software updates for enclaves that share resources, e.g. memory resources, with other enclaves.

Memory resources can be separated into independent regions, and access thereto can be restricted via physical memory protection (PMP). For example, PMP can restrict the physical memory access of supervisor and user mode to specific physical memory regions. PMP address registers encode the address of a contiguous physical region, and PMP configuration bits specify read-write-execute permissions for the memory regions. The present disclosure further provides for reducing the number of PMP entries required for a particular system. Reducing the number of PMP entries increases the maximum number of enclaves capable of being hosted by a given system because the number of enclaves on a CPU and shared memory regions is limited by the number of available PMP entries.

Aspects of the present disclosure thereby provide for improvements in the security of computing systems, e.g. cloud computing systems, that rely on enclaves to process sensitive data. In particular, aspects of the present disclosure allow for software executed by individual enclaves—which interact with other enclaves in a computing system—to be updated, e.g. to address potential security risks, in a manner that enables trust to be maintained between the enclave that is updated and other enclaves with which it interacts. In particular, aspects of the present disclosure allow trust to be maintained between independent enclaves that interact with one another by facilitating the acknowledgement of an enclave update by other enclaves that interact with the enclave that is updated. In contrast, alternative methods that rely on re-attestation of an updated enclave to reestablish trust require significant additional communication overhead which prolongs service downtime.

Furthermore, aspects of the present disclosure additionally improve the performance of such computing systems by providing a streamlined process for updating the software executed within such enclaves. In particular, aspects of the present disclosure allow software updates to be performed in a manner that is less intrusive to the overall computing system as compared with state of the art techniques, e.g. due to reduced enclave downtime during update procedures. Aspects of the present disclosure allow large computing systems that rely on the processing capabilities of multiple enclaves to perform updates of software executed by individual enclaves with minimal disruption to other components of the computing system, thereby improving overall system performance.

According to a first exemplary aspect of the present disclosure, a method is provided for dynamically installing and attesting software updates for enclaves, which includes:
1) SM obtaining software update for enclave;
2) SM waiting until enclave enters a safe state to install software update (SM usually requests the enclave to enter a safe state and the enclave notifies the SM when it has done so);
3) SM stopping enclave execution and blocks enclave access to shared resources (this makes use of controlling access to shared resources with their locks);
4) SM installing software update;
5) SM resuming enclave execution from safe state;
6) SM informs other enclaves about the software update (the information sent to other enclaves contains details about the software update, in particular, measurements about the old and new enclave code; this makes use of allowing the SM to measure the enclave code independently from the current enclave state/data);
7) SM unblocks access to shared resources after receiving the acknowledgments of the software update According to a second exemplary aspect of the present disclosure, a non-transitory computer readable medium is provided, which contains executable code, which when executed by at least one processors, causes the method according to the first exemplary aspect to be executed.

According to a third exemplary aspect of the present disclosure, a system is provided, which includes one or more processors which (alone or together) are configured to execute the method according to the first exemplary aspect. The one or more processors can be provided at one or more physical machines that include compute resources, storage resources, and network resources. The compute resources can include, e.g., the one or more processors, each of which may have one or more processor cores. The storage resources can include, e.g., computer readable memory, e.g., random-access-memory (RAM) and/or cache memory. The network resources can include, e.g., a physical network interface controller (NIC). Such a physical machine can additionally include a bus that couples various system components, e.g. the processors and the computer readable memory, together. The network interface controller enables it to interface with other components.

Aspects of the present disclosure enable a reduced downtime of an enclave with notification to other enclaves (e.g., when patching or updating the enclave's software). Only SM (trusted by all enclaves) can change the executable of an enclave. While state of the art methods may be limited to Intel CPUs with SGXv2 and not suitable for SGXv1, implementations according to the present disclosure are capable of operating in CPU platforms/architectures with an SM (e.g., RISC-V and Keystone).

According to an implementation of the first aspect of the disclosure, a method for implementing a software update for a selected enclave of a computing system is provided. The method includes obtaining, by a security monitor (SM) of the computing system, the software update for the selected enclave, installing, by the SM, the software update for the selected enclave to provide updated enclave software code, and measuring, by the SM, the updated enclave software code to provide a software update measurement. The updated enclave software code is stored in a memory region isolated from a memory region in which data for the selected enclave is stored. The method further includes transmitting, by the SM, the software update measurement to one or more respective other enclaves that share a memory region with the selected enclave.

According to an implementation, the SM is a firmware component that provides for low-level control of the physical memory of the computing system.

According to an implementation, the SM provides read, write, and execute permissions to the memory region in which the updated enclave software code is stored, to the memory region in which data for the selected enclave is stored, and to the shared memory regions.

According to an implementation, the memory region in which the updated enclave software code is stored is write-protected such that only the SM can perform modifications of the memory region in which the updated enclave software code is stored.

According to an implementation, the memory region in which the updated enclave software code is stored, the memory region in which the data for the selected enclave is stored, and the shared memory regions each has a separate physical memory protection (PMP) entry.

According to an implementation, the method further includes, before installing the software update for the selected enclave, verifying, by the SM, the integrity of the software update. Verifying the integrity of the software update includes one or more of: a signature check of the software update, a check that a hash of old code included in the software update matches code currently running inside the selected enclave, a check of a platform identifier in the software update.

According to an implementation, the method further includes, before installing the software update for the selected enclave, instructing, by the SM, the selected enclave to enter an updatable state. Instructing the selected enclave to enter an updatable state includes instructing the selected enclave to release any lock on any of the shared memory regions.

According to an implementation, the method further includes before installing the software update for the selected enclave, blocking, by the SM, any execution context switch to the selected enclave.

According to an implementation, the method further includes before installing the software update for the selected enclave, blocking, by the SM, access to the shared memory regions.

According to an implementation, the method further includes after transmitting the software update measurement to the one or more respective other enclaves that share a memory region with the selected enclave, unblocking, by the SM, access to the shared memory regions after receiving an acknowledgments of the software update from the one or more respective other enclaves.

According to an implementation, transmitting the software update measurement to one or more respective other enclaves that share a memory region with the selected enclave includes additionally transmitting, by the SM, one or more of: an old code measurement corresponding to a prior version of the enclave software code, a version number of the updated enclave software code, a version number of the prior version of the enclave software code, a public key of an entity that published the software update, a CPU platform identifier.

According to an implementation of the second aspect of the disclosure, a tangible, non-transitory computer-readable medium is provided having instructions thereon which, upon being executed by one or more hardware processors, alone or in combination, provide for execution of a method for implementing a software update for a selected enclave of a computing system. The method includes obtaining, by a security monitor (SM) of the computing system, the software update for the selected enclave, installing, by the SM, the software update for the selected enclave to provide updated enclave software code, and measuring, by the SM, the updated enclave software code to provide a software update measurement. The updated enclave software code is stored in a memory region isolated from a memory region in which data for the selected enclave is stored. The method further includes transmitting, by the SM, the software update measurement to one or more respective other enclaves that share a memory region with the selected enclave.

According to an implementation of the third aspect of the disclosure, a system is provided for implementing a software update for a selected enclave of a computing system. The system includes processing circuitry configured to: obtain the software update for the selected enclave; install the software update for the selected enclave to provide updated enclave software code; measure the updated enclave software code to provide a software update measurement, wherein the updated enclave software code is stored in a memory region isolated from a memory region in which data for the selected enclave is stored; and transmit the software update measurement to one or more respective other enclaves that share a memory region with the selected enclave.

In the following, a system model according to an aspect of the present disclosure and background are described. Then exemplary aspects of the present disclosure configured to protect and separate enclaves, and how enclaves share resources (memory), are described. Finally, an exemplary implementation of an aspect of the present disclosure that is configured to update or patch the software running inside an enclave is described.

System Model

A system architecture similar to RISC-V and Keystone [D. Lee, D. Kohlbrenner, S. Shinde, K. Asanović, and D. Song: "Keystone: An Open Framework for Architecting Trusted Execution Environments", EuroSys 2020—the entire contents of which are hereby incorporated by reference herein] can be considered for understanding certain aspects of the present disclosure. FIG. 1 illustrates a system architecture in which aspects of the present disclosure can be implemented. The lowest layer of the system architecture includes the central processor unit (CPU) platform 100 and possibly other hardware features. The lowest layer of the system architecture also includes a root of trust, which can also be referred to as a trust anchor. The layer above comprises the firmware of the CPU platform, including security monitor (SM) 102. The firmware can also include, e.g., a bootloader and a basic input/output system (BIOS) used to provide runtime services for operating systems and programs. Above the SM runs the operating system (OS) 104. On top of the OS run normal applications (e.g. App 1 106.1, . . . , App N 106.N). Enclave applications (e.g. Enclave App 1 108.1, . . . , Enclave App M 108.M) run on top the SM. They are separated from the OS and the normal applications.

The hardware and the SM is trusted while the OS and everything above it is untrusted. Note that an enclave application does not necessarily trust another enclave application, even when they communicate with each other. That means that trust between enclaves must be established before their collaboration and renewed when one of them changes.

The SM runs in machine mode, the highest privileged mode. The OS runs in the second highest mode, i.e., supervisor mode, and applications on top of the OS run in user mode, the lowest privileged mode. Most parts of the enclave application also run usually in user mode. However, they might include OS-like functions to prevent certain attacks from the OS, in that case such functions will run in supervisor mode, as the OS. That is, enclave applications may comprise two layers, one user mode layer and one supervisor mode layer. The supervisor mode layer of an enclave is also sometimes called the enclave runtime. It is, for example, responsible for managing the enclave's memory.

As the SM runs in machine mode, the SM can block or postpone interrupts and exceptions, if it does not directly handle them itself. The SM can also delegate interrupts to the next higher level, typically to the OS. The SM is also invoked on context switches, which are triggered by the scheduler of the OS.

One key feature of the SM is to partition the physical memory and restrict access to the corresponding memory regions. In particular, the OS memory is separated from the enclaves' memory. Note that the OS further partitions and manages the memory of the applications on top of the OS. For RISC-V CPU platforms, the SM can leverage the CPU's Physical Memory Protection (PMP) for enforcing memory separation.

Memory Protection

Figure 2:
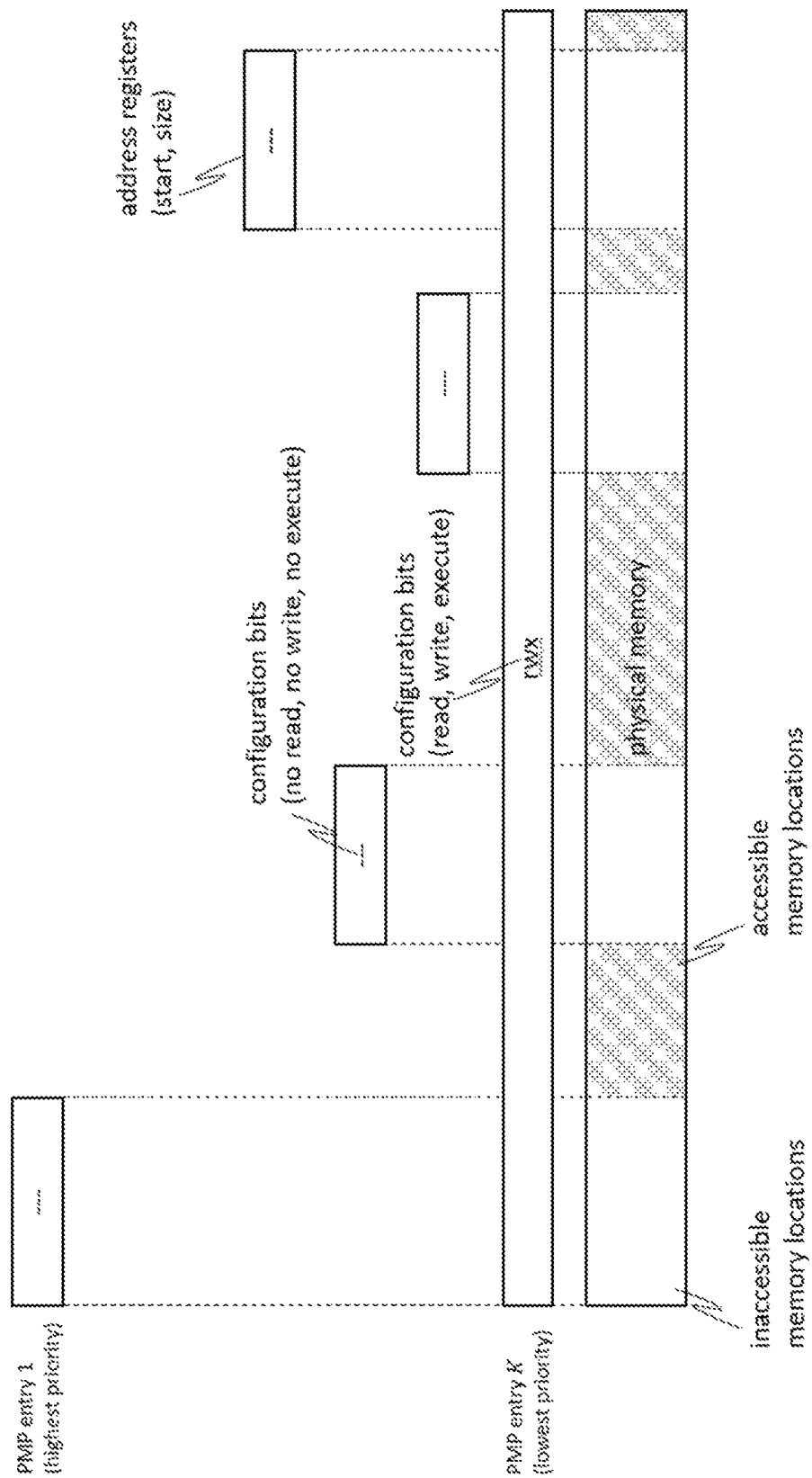
FIG. 2 illustrates separation of physical memory of a device via physical memory protection (PMP)

FIG. 2 illustrates separation of the physical memory of a device via PMP. The PMP restricts the physical memory access of supervisor and user mode to physical memory regions. Note that both these modes typically manage memory virtually by maintaining page tables. A virtual address is translated into a physical address by using the Memory Management Unit (MMU). The MMU can be, for example, a computer hardware unit located at the lowest layer of the system architecture of FIG. 1. In alternative embodiments, the MMU can be, for example, partly implemented as low level, e.g. firmware, code. The PMP address registers encode the address of a contiguous physical region. Furthermore, PMP configuration bits specify read-write-execute permissions for the memory regions. The lower-numbered PMP entries (address registers with configuration bits) take priority over the higher-numbered entries. If user or supervisor mode attempts to access a physical address and it does not match any PMP address range or has not the corresponding privileges, the hardware does not grant access.

Each CPU core has its own PMP entries. The number of PMP entries is bounded. Current hardware typically has 8, 64, or even 128 PMP entries (per CPU core). Inter-processor-interrupts (IPIs) are used to propagate changes on the PMP entries across the CPU cores. For instance, the creation of an enclave triggers the update of all PMP entries on all CPU cores, often including the creation of new PMP entries for the new enclave. In contrast, no IPI is necessary when the execution context switches on a CPU core. Only the core's existing PMP entries must be reconfigured, i.e., the permissions of the stopped process must be revoked and the permissions of the started process must be set.

Keystone [D. Lee, D. Kohlbrenner, S. Shinde, K. Asanović, and D. Song: "Keystone: An Open Framework for Architecting Trusted Execution Environments", EuroSys 2020—the entire contents of which are hereby incorporated by reference herein] protects the memory of the SM, the OS, and the enclaves by having one PMP entry for each of them. When creating an enclave, a PMP entry corresponding to the enclave is created on all CPU cores. Analogously, when deleting an enclave, the PMP entry corresponding to the enclave is deleted. Note that creating and deleting an enclave involves an IPI to reconfigure the PMP on all CPU cores. Furthermore, note that the SM requests the OS to provide a memory region for enclave creation, and when deleting an enclave the memory is given back to the OS. When switching the execution context on a CPU core from the OS to an enclave or from an enclave to the OS, the SM reconfigures the configuration bits of the involved PMP entries on the CPU core. Note that no IPI is necessary when switching the execution context, since the reconfiguration of the PMP entries are local to the CPU.

In Keystone, when the execution context is switched to the OS, the PMP entry with the lowest priority (i.e. PMP entry K) has read-write-execute permissions (rwx) and all other defined PMP entries, including the one for the SM, have no permissions (---). This protects all the physical memory regions that are not under the control of the OS. FIG. 2 illustrates separation of the physical memory of a device via PMP. In FIG. 2, the execution context is switched to the OS such that PMP entries corresponding to physical memory regions that are accessible to the OS have read, write, execute (rwx) permissions while PMP entries corresponding to physical memory regions that are not accessible to the OS (i.e. the inaccessible memory locations) have no rwx permissions (---). Analogously, when the execution context switches to an enclave, its corresponding PMP entry has read-write-execute permissions (rwx) and the other PMP entries, including the one for the OS, have no permissions (---).

Elasticlave [J. Z. Yu, S. Shine, T. E. Carlson, and P. Saxena: "Elasticlave: An Efficient Memory Model for Enclaves", Usenix Security 2022—the entire contents of which are hereby incorporated by reference herein], which is based on Keystone, uses additional PMP entries to implement the sharing of data between enclaves and also between an enclave and the OS. Each shared memory region is owned by an enclave, which can grant access to it to other enclaves or the OS. The owner of a shared memory region is unique, and the owner can grant access to the region to multiple entities. For each shared memory region, Elasticlave uses an additional PMP entry to restrict the access to the region. Furthermore, a shared memory region can be locked, allowing only the holder of the lock to access it. The PMP configuration bits depend on the permitted permissions of the entity that currently has the execution context, and whether the entity holds the lock.

To protect the content of an enclave, aspects of the present disclosure additionally partition the memory of an enclave into two memory regions, each with its own PMP entries. The first region contains the enclave's code and the second region contains the enclave's data. When the enclave has the execution context, the first region has read-execute permissions (r-x) and the second region has read-write permissions (rw-). Both regions have no permissions (---) when the enclave does not have the execution context. This separation enforces that the SM is involved when changing enclave code, e.g., when updating or patching the enclave. Furthermore, an enclave cannot execute arbitrary code (intentionally or unintentionally) that is stored in its data partition.

For every execution context switch on a CPU core, the SM is invoked and alters the configuration bits of the PMP entries accordingly. The address registers of the PMP entries on the CPU core are not altered by the SM; only some of the configuration bits of the PMP entries on the CPU core are altered. In Keystone, the configuration bits are always set rwx for the entity that obtains the execution context and to---from which the execution context is revoked. In contrast, in Elasticlave, the configuration bits of the PMP entries for the shared memory regions depend on the permissions that the enclave possesses and that obtains the execution context and whether the region has been locked. The permissions and the lock status is maintained by the SM. Recall that when creating or deleting an enclave with its memory regions, an IPI ensures that all CPU cores have the same PMP entries.

In Elasticlave, enclaves can access (read/write) shared memory if no enclave holds the lock. This can, e.g., lead to race conditions, when two enclaves want to write to the same memory location without first acquiring the lock. In contrast, according the techniques of the present disclosure, an enclave can only access a shared memory region if it possesses the region's lock. In particular, if no enclave holds the lock, no enclave can access the memory region. Note that private memory regions, i.e., memory regions that are not shared, can be accessed without locking.

The number PMP entries used is $2+2e+s$, where e is the number of enclaves and s is the number of shared memory regions (i.e. one PMP entry for the SM and one PMP entry for the OS in addition to the PMP entries for enclaves and shared memory regions). PMP entries protect memory regions by restricting access (e.g. read/write/execute) to a memory region. According to aspects of the present disclosure, each enclave has 2 memory regions: one protects the enclave code and the other protects the enclave data. Furthermore, each shared memory region is also protected by a PMP entry. Finally, the SM and the OS also have "their" own PMP entries.

Figure 3:
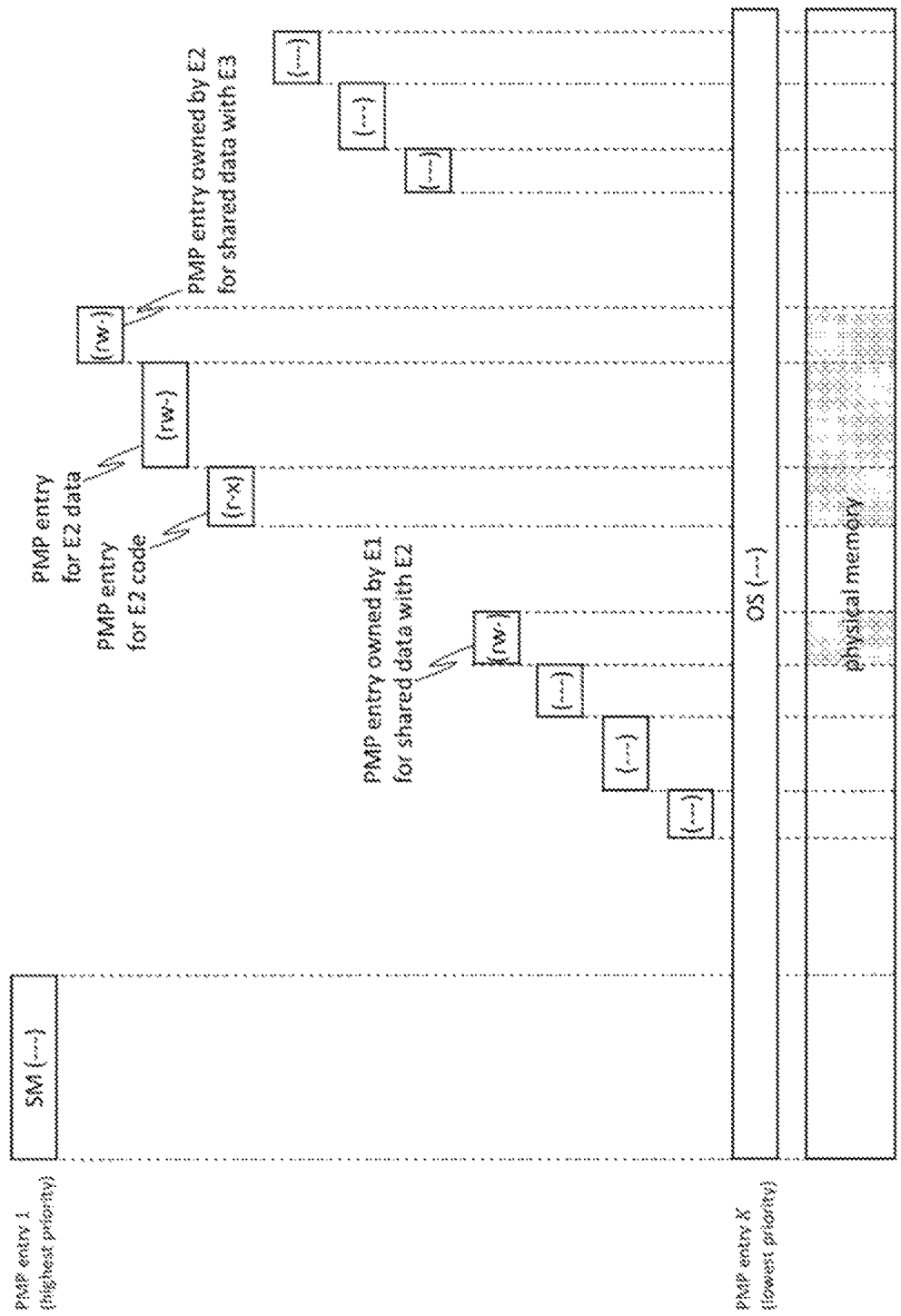
FIG. 3 illustrates partitioning of physical memory of a device in which respective enclaves are provided with multiple PMP entries corresponding to unique memory regions assigned to the respective enclave.
Figure 3A:
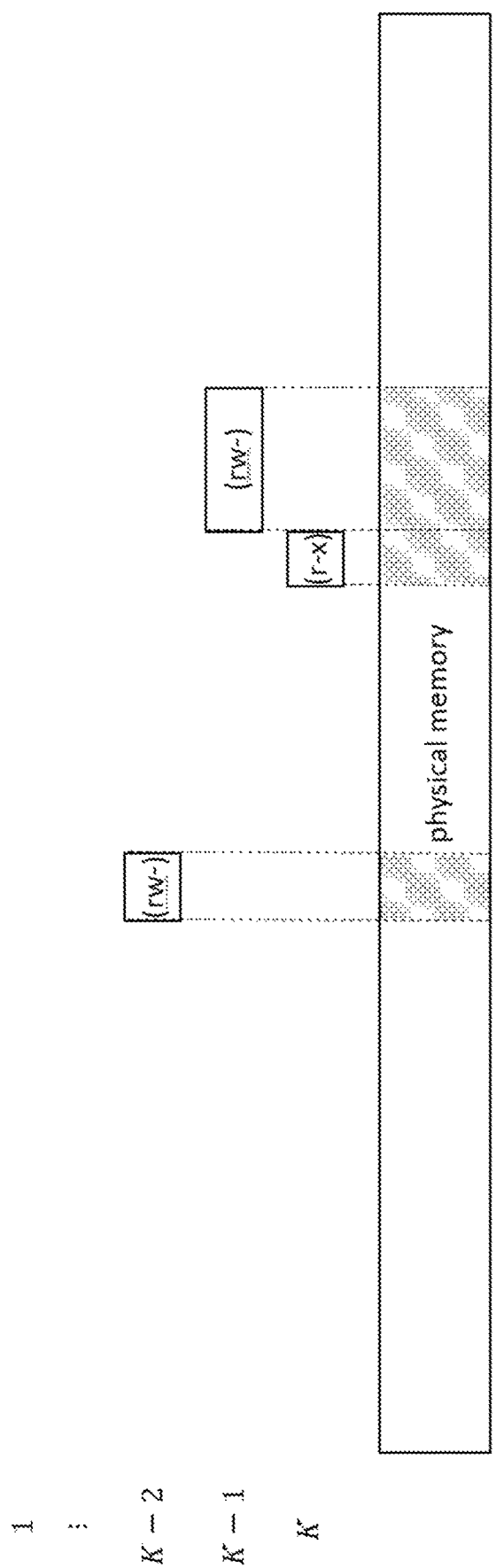
FIG. 3A illustrates permissions assigned for unique memory regions assigned to a respective enclave when the respective enclave has execution context.

For illustration, see FIG. 3, with three enclaves E1, E2, and E3 and the following shared memory regions. E1 owns two shared memory regions: one with E2 and the other one with the OS. Furthermore, E2 owns a shared memory region with E3 and E3 owns a shared memory region with the OS. This shared memory structure is typical for processing data in a pipeline. E1 implements the first pipeline stage. It receives data, which it reads from the shared memory region with the OS. The processed data is then written to E1's other shared memory region, from which E2 reads it. E2 implements the second pipeline stage. Its output is written to its shared memory region. E3 implements the third pipeline stage, which reads its input from the memory region shared with E2 and its output to the memory region shared with the OS. Note that although E1 reads only data items from the shared memory region owned by E1, it must have write permissions to it, since it must remove or mark a data item when it has read it. In FIG. 3A only E2 has the execution context (there is only one execution context for a CPU core at any one time).

The PMP entries can be a scarce resource on CPU platforms. In the following, a method for reducing the number of required PMP entries is presented. The method uses at most $2+e+s'$ PMP entries, where e is as above, i.e., the number of enclaves, and s' is the maximal number of shared memory regions that an enclave or the OS can access (including the ones that are owned by the enclave). Note that $2+e+s' \leq 2+2e+s$, since $s' \leq s$. There is however some additional performance overhead when switching the execution context, since more PMP entries must be reconfigured. If the CPU platform runs out of PMP entries, the SM can switch to this method to host all enclaves and protect the shared memory regions.

Another difference to Elasticlave is that enclaves and also the OS first acquire the lock of a shared memory region before they can access it. One reason for this is that accessing a shared memory without locking can result in race conditions. Another reason is that this will in general lead to fewer PMP entries. The SM can even limit the number of locks an entity can hold at a time. Finally, note that for a single threaded enclave (i.e. an enclave that is a single, sequential program that does not run multiple processes concurrently) that locks or unlocks a shared memory region, no PMP entries on other CPU cores must be updated.

An entity acquires the lock of a shared memory region by requesting and eventually receiving the lock for the respective memory region. If the lock for a respective memory region is not free (e.g. because another entity possesses it to access the respective memory region), the entity requesting the lock can wait to receive the lock. A respective memory region can only be accessed by an entity if it has previously acquired the lock and has not released the lock once acquiring it. Locks are a synchronization primitive, which are typically managed by the OS. Note that the locks here are managed by the SM. That is, the OS and also the enclaves must first request a lock from the SM. If no other entity is possessing the lock at the moment, the SM will give the lock to the requesting entity, e.g. the OS. If the entity is done accessing a shared memory region, it will release the lock so that other entities can acquire it and access that shared memory region. This ensures that at most a single entity can access the shared memory region at a time.

Exemplary pseudo code for reconfiguring the PMP entries on a context switch is provided by the following Listing 1, which sets the PMP entries when giving the execution context to the entity C on the CPU core c, starting from the PMP entry with the lowest priority, i.e., the PMP entry K, and reconfiguring the PMP entries in descending order.

LISTING 1: PMP UPDATE ON CONTEXT SWITCH:

```
set_pmp_entries (c, C) :
    k = K - 2
    #  Case split: OS or enclave obtains the execution context.
    if C = OS :
        #  Set the lowest PMP entry for the OS.
        set_pmp_entry (c, K, OS.region, rwx)
        #  Protect SM's memory region.
        set_pmp_entry (c, K - 1, SM.region,   ---)
        #  Protect the enclaves' memory regions.
        for E in enclaves:
            set_pmp_entry (c, k, E.region,   ---)
            k = k - 1
```

-continued

LISTING 1: PMP UPDATE ON CONTEXT SWITCH:

```
    #   Give access to the memory regions that are shared
with the OS and
    #   locked by the OS.
    for S in OS. shared_regions:
        if S.locked_by (OS) :
            set_pmp_entry (c,      k,      S.region,
S.permissions (OS) )
            k = k - 1
    else:
        #  Set the two lowest PMP entries for the enclave's
code and data.
        set_pmp_entry (c, K, C. code region, r-x)
        set_pmp_entry (c, K - 1, C.data region, rw-)
        #  Set PMP entries for shared memory regions.
        for S in C.shared regions:
            if S.owned_by (C) :
                if not S.is_locked or not S.locked_by (C) :
                    #  Protect region.
                    set_pmp_entry (c, k, S.region,   ---)
                    k = k - 1
            else:
                if S.locked_by (C) :
                    #  Give access to region.
                    set_pmp_entry (c,      k,      S.region,
S.permissions (C) )
                    k = k - 1
    #  Invalidate previously used PMP entries, if any.
    t = k
    for t > largest_undefined_pmp_entry [c] :
        undefine_pmp_entry (c, t)
        t = t - 1
    #  Store the currently largest undefined PMP entry.
    largest_undefined_pmp_entry [c] = k
```

Figure 4:
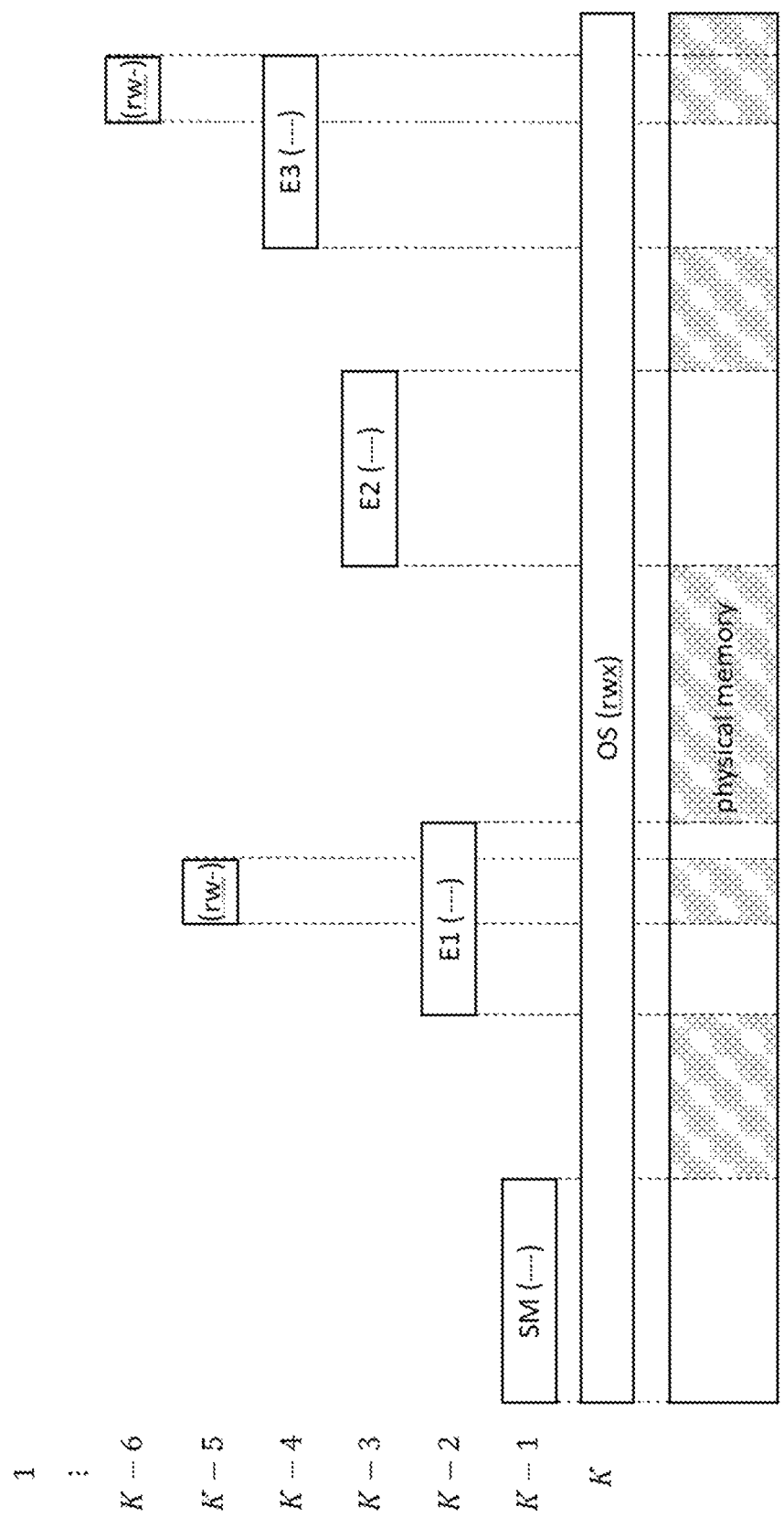
FIG. 4 illustrates permissions assigned for unique memory regions assigned to different enclaves when the operating system (OS) has execution context.

FIGS. 3 and 3A illustrate a PMP entry configuration when an enclave has the execution context according to an embodiment. FIG. 4 illustrates a PMP entry configuration when the OS has the execution context according to an embodiment—assuming the corresponding entity with the execution context has locked all of the memory regions that it shares with other entities from access by those other entities. The PMP entries are grouped into layers. When an enclave has the execution context, the lowest layer is for the enclave that is executing. The PMP entry with the lowest priority is used as a "slider" for providing access to the enclave code and the second lowest one is used as a "slider" for the enclave's data regions, including the shared data regions that the enclave owns. The layer above provides and restricts permissions to shared memory regions. When the OS has the execution context, the lowest layer is for the OS. The layer above protects the memory regions of the enclaves, and the third layer provides access to the shared memory regions with the OS.

The PMP entries differ on CPU cores on which different entities have the execution context. However, an IPI is still necessary when creating an enclave since either corresponding new PMP entries must be added on each CPU core to protect the memory of the newly created enclave. Similarly, when deleting an enclave, its memory should be given back to the OS after ensuring the contents are not readable anymore, e.g. by zeroing the region.

When an entity locks or unlocks a shared memory region, the SM must update the PMP entries on the CPU cores on which the entity has currently the execution context. In particular, if an enclave is single-threaded, only the PMP entries where the enclave has currently the execution context must be updated. However, note that an IPI is still necessary to avoid race conditions for acquiring and releasing locks.

Exemplary pseudo code for updating the PMP entries on the CPU core c when locking the shared memory region S is provided by the following Listing 2, where E is the entity that is locking S.

LISTING 2: PMP UPDATE FOR LOCKING
A SHARED MEMORY REGION:

```
pmp_update_lock_region (c, E, S) :
    C = executing_entity (c)
    if not C = E:
        #   Since E does not execute on c, no access for C on
c.
        return
    else if S.owned_by (C) :
        #  Find the PMP entry for S.
        k = K - 2
        for k > largest_undefined_pmp_entry [c] :
            if pmp_entry_region (c, k) = S:
                #  Remove the PMP entry to grant access for
C to S.
                undefine_pmp_entry (c, k)
                #  Adjust layer size.
                if k - 1 = largest_undefined_pmp_entry [c] :
                    largest_undefined_pmp_entry [c] = k
                break
            k = k - 1
    else:
        #  Find a PMP entry that is undefined.
        k = K - 2
        if C = OS :
            k = K - 1 - num_enclaves
            for k >= largest_undefined_pmp_entry [c] and
pmp_entry_defined (c, k) :
            k = k - 1
        #  Add PMP entry to grant access for C to S.
        set_pmp_entry (c, k, S.region, S.permissions (C) )
        #  Adjust layer size.
        if k = largest_undefined_pmp_entry [c] :
            largest_undefined_pmp_entry[c] = k
```

Exemplary pseudo code for updating the PMP entries when unlocking a shared memory region is similar, and is provided by the following Listing 3.

LISTING 3: PMP UPDATE FOR UNLOCKING
A SHARED MEMORY REGION:

```
pmp_update_unlock_region (c, E, S) :
    C = executing_entity (c)
    if not C = E:
        #   Since E does not execute on c, C has no access to S
on c.
        return
    else if S.owned_by (C) :
        #  Find a PMP entry that is undefined.
        k = K - 2
        for    k    >=    largest_undefined_pmp_entry [c]    and
pmp_entry_defined (c, k) :
            k = k - 1
        #  Add PMP entry to revoke access.
        set_pmp_entry (c, k, S.region,  --- )
        #  Adjust layer size.
        if k = largest_undefined_pmp_entry [c] :
            largest_undefined_pmp_entry [c] = k
    else:
        #  Find the PMP entry for S.
        k = K - 2
        if C = OS :
            k = K - 1 - num_enclaves
        for k > largest_undefined_pmp_entry [c] :
            if pmp_entry_region (c, k) = S:
                #  Remove PMP entry to revoke access.
                undefine_pmp_entry (c, k)
```

LISTING 3: PMP UPDATE FOR UNLOCKING
A SHARED MEMORY REGION:

```
# Adjust layer size.
if k - 1 = largest_undefined_pmp_entry [c] :
    largest_undefined_pmp_entry [c] = k
    break
k = k - 1
```

Optimizations: The linear searches for finding an undefined PMP entry or the shared region can be avoided by some bookkeeping. To this end, each shared region gets assigned to a unique identifier in in the range of 1, ..., N. In the following, a shared memory region is identified with its identifier. For each CPU core c, an array index_pmp_entry[c] of length N is maintained: index_pmp_entry[c] [r] stores the index at which the PMP entry for the region r is stored. The index is 0 if there is no PMP entry for r. A context switch includes the update of index_pmp_entry[c]. The array index_pmp_entry[c] of length N can be zeroed by mems et. Furthermore, for each CPU core c, a stack undefined_pmp_entries[c] of the undefined PMP entries is maintained. The stack is cleared by a context switch. A pop on the empty stack returns largest_undefined_pmp_entry[c] and decrements largest_undefined_pmp_entry[c]. Analogously, when pushing the value largest_undefined_pmp_entry[c]−1 on the stack, we increment largest_undefined_pmp_entry[c]. The optimized version of pmp_unlock_region (c, E, S) is provided by the following Listing 4. The optimized version of pmp_lock_region (c, E, S) is similar and omitted.

LISTING 4: OPTIMIZED PMP UPDATE FOR
UNLOCKING A SHARED MEMORY REGION:

```
pmp_update_unlock_region (c, E, S) :
    C = executing_entity (c)
    if not C = E:
        return
    else if S.owned by (C) :
        k = undefined_pmp_entries [c] .pop ( )
        set_pmp_entry (c, k, S.region, --- )
        index_pmp_entry [c] [S.id]  =  k
    else:
        k = index_pmp_entry [c] [S.id]
        undefine_pmp_entry (c, k)
        index_pmp_entry [c] [S.id] = 0
        undefined_pmp_entries [c] .push (k)
```

The worst-case complexity reduces from O(n) to O(1). As in the unoptimized version, the error handling may be omitted, e.g., when there are no PMP entries left. In this case the pop operation above would return the index 0.

Another optimization is based on the observation that PMP entries with adjacent memory regions and the same permissions can be merged. In particular, when the OS has the execution context, fewer PMP entries may be necessary for protecting the enclave memory when enclaves are arranged in a continuous memory block.

A third optimization concerns the access to the shared memory regions. The locks for the shared memory regions and the PMP reconfiguration can be refined by distinguishing between read and write operations. Multiple entities can hold a read lock for a shared memory region and simultaneously read from the shared memory region. In contrast, only a single write lock per shared memory region is allowed.

The SM manages the locks. The SM does not check at runtime for deadlock situations. For example, two enclaves can block each other, when each of the two enclaves is waiting to acquire the lock of a shared memory region that is already locked by the other enclave. Such a deadlock-detection feature can be added to the SM and the SM could, e.g., terminate the enclaves that are involved in the deadlock after sealing their states. Analogously, a malicious OS could try to block an enclave by acquiring all the locks of the shared memory regions and not releasing them. This could lead to a denial of service. However, a malicious OS can achieve a similar result by never switching the execution context to the enclave.

Code Updates

Most of today's software is regularly updated for various reasons, including performance improvements, the support of new features, or fixing software bugs. The software that is running inside enclaves is no exception to this, although the software is often thoroughly tested and sometimes even formally verified because of its criticality. Updating an enclave is to be done with special care, as it is trusted by others—e.g. other enclaves. Updating an enclave's software should also be attested similar to the attestation for the proper enclave deployment. In particular, the entities that communicate with the enclave (either by providing data to the enclave or reading data from the enclave) should be made aware of a software update. They could then renew the trust or revoke it by ceasing communication with the enclave. However, running a full attestation process results in a significant downtime of the enclave for which the service offered by the enclave is unavailable. Note that before an enclave starts sharing data with another enclave, both enclaves usually identify each other, which includes a check and attestation of their trustworthiness. The attestation often involves trusted remote third parties.

At the core of attesting an enclave (i.e., checking whether the enclave is in the expected state) are measurements of its state. These measurements are usually based on cryptographic hash functions. Because of the separation between enclave code and enclave data (cf. FIG. 3), the parts (i.e. the enclave code and the enclave data) can be measured and attested separately. Note that the enclave itself cannot modify its code base, since the write flag of the configuration bits of the corresponding PMP entry is not set. For updating or patching the enclave code, the SM must be invoked. That is, the SM coordinates the software update and ensures that the update comes from a trusted source, e.g. by checking that the running enclave software and the patch are signed by the same key. Similarly to Intel SGX, we assume that the binaries that run in the enclave are signed by the owner and include the hash of the code. The SM can retrieve the identity of the owner from those binaries.

Figure 5:
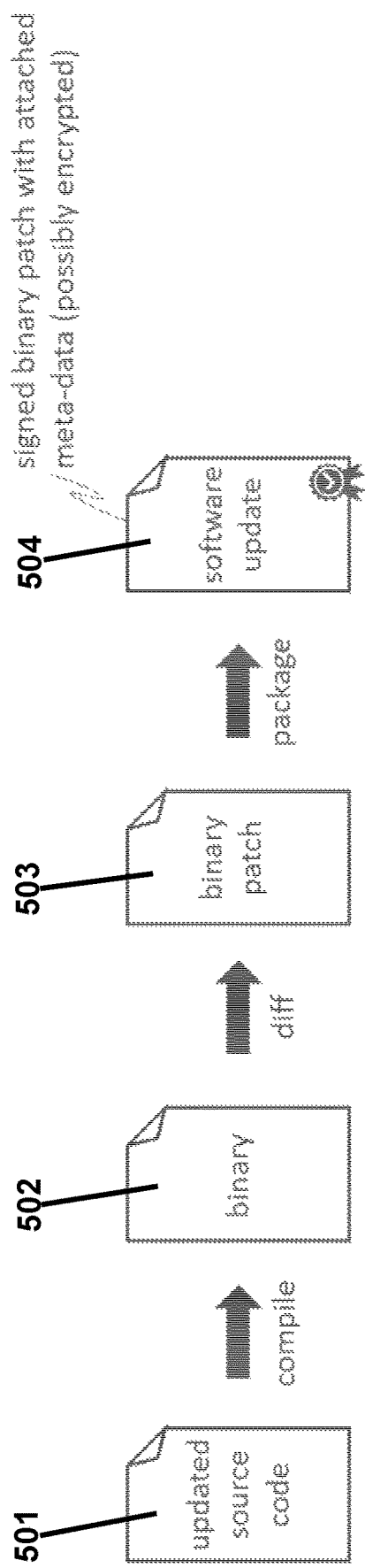
FIG. 5 illustrates a process for providing a software update.

A prerequisite for updating or patching an enclave E is that the app/enclave owner has submitted the enclave's software update. FIG. 5 illustrates the steps of creating a software update. At 501, the updated source code is first compiled to provide a binary at 502. The difference between the resulting binary and the binary of the old binary is then computed to provide a binary patch at 503. This step is optional. However, note that the difference can be significantly smaller and reduces thus the size of the software update, even when compressing the binary, which is another option here. See [Colin Percival: "Matching with Mismatches and Assorted Applications", University of Oxford 2006—the entire contents of which are hereby incorporated by reference herein] for a comparison of various different methods. Finally, the binary patch is packaged as a software update at 504. First, meta-data is attached to the binary, which includes the hashes of the binaries, i.e., the old and the new enclave code. Typically, the meta-data also includes the version numbers, a timestamp, the identifier of the issuer/owner, and the identifier of the CPU platform for the software update. The meta-data can, e.g., be given as an XML file or a JSON object. FIG. 6 illustrates an example of the meta-data attached to a binary patch that is packaged as a software update. For confidentiality reasons, the software update can also be encrypted. If this is the case, the SM has access to the key for decrypting the software update. Finally, the bundle (possibly encrypted) of binary patch and meta-data is signed. It may be assumed that the enclave has the owner's public key and the SM can request this key from the enclave. The owner's public key is usually hard coded into the enclave code. Hence, the SM can check the signature of the software update.

The software update is triggered by an application running on top of the OS. Usually, this application is the application that triggered also the installation of the enclave. However, this application is untrusted since it runs in the realm of the OS, which is also untrusted. The application has previously received the software update, which it either stores in main memory or on disk. For triggering the software update, the application contacts the SM with a link to the software update. When the SM receives the request for the software update, the SM loads the software update into protected memory. If the SM has not enough protected memory, it requests more memory from the OS. As protecting the memory regions for the enclaves, the PMP can be used so that only the SM has access to its copy of the software update. After the SM has finished the software update, the SM releases the memory back to the OS (zeroing it for not leaking confidential information).

Figure 7:
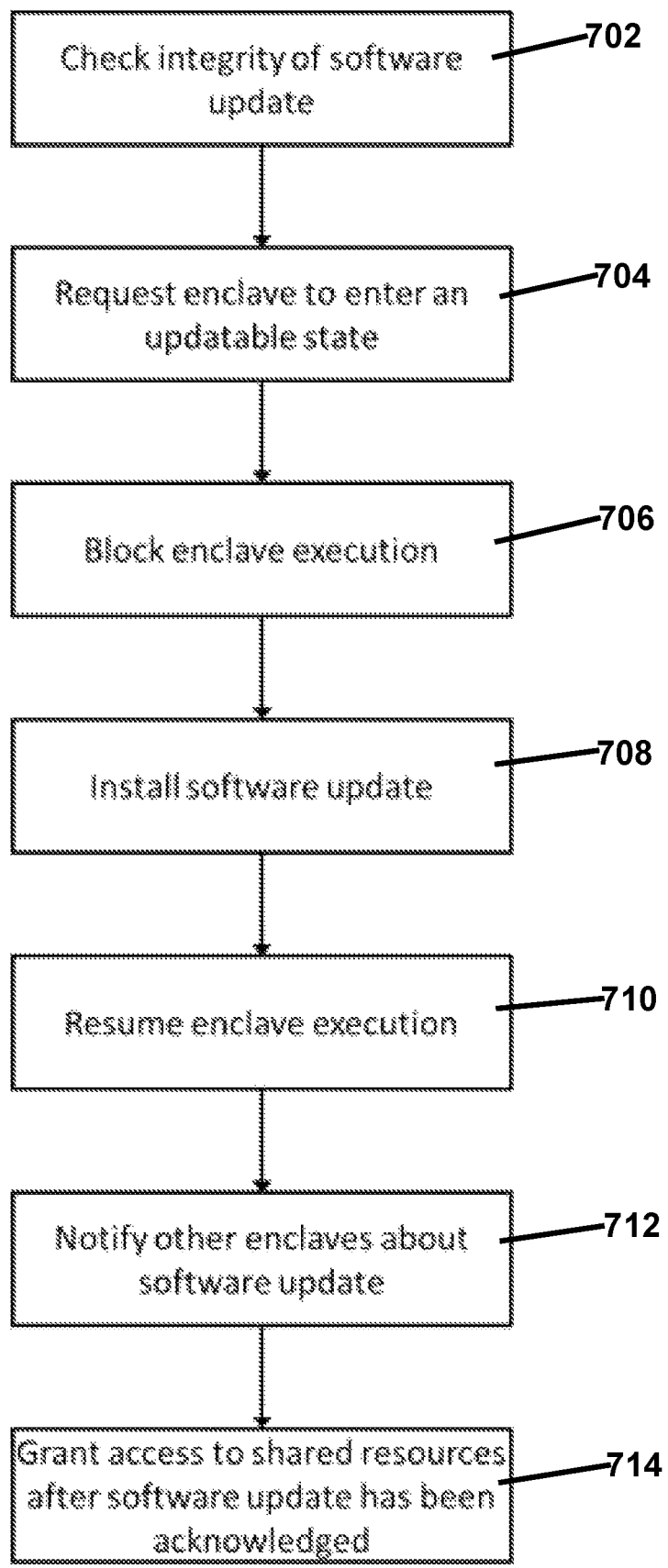
FIG. 7 illustrates a process for updating/patching software executed by an enclave.

FIG. 7 illustrates a process performed, according to an embodiment, by the SM to install the software update for the enclave E. First, at 702, the SM checks the integrity of the received software update. This check includes a signature check of the software update. It also includes a check that the hash of the old code included in the software update matches the code that is currently running inside the enclave. If one of these checks fails, the SM considers the update invalid and aborts the update process. In the following, $H_{code}$ (E) denotes the measurement (hash) of the memory region with the code of the enclave E. Note that the SM can easily compute $H_{code}(E)$, since E's code is stored in a contiguous memory region. When a platform identifier is included, the SM also checks it. If the software update is encrypted, the SM first decrypts the software update. If the platform identifier is included in the software update, the SM also checks it. If there are different platforms running the same enclave, each of them should receive its respective software update.

After performing these checks, at 704 the SM requests the enclave E to enter an updatable state. E notifies the SM when it has entered an updatable state. First, for E being in an updatable state, E must not hold any lock to a shared memory region. Further restrictions on E's state of being updatable depend on the method used to dynamically update software. The method described here to dynamically update the software of an enclave is agnostic to the method for dynamically updating software. However, the used dynamic-software-update method is fixed in advance as these methods differ on the assumption and requirements on the running software that is updated. In the simplest case, a software update must only migrate code. For instance, code migration is sufficient when the software update reimplements functions without changing the implementation of any data structure of data items that are currently stored on the heap. A state in which the updated functions are not on the call stack is updatable. Essentially, the functions' old code can be replaced by their new code. These restrictions exclude the update of long running functions but cover already a significant class of dynamic software updates. Cf [N. Weichbrodt, J. Heinemann, L. Almstedt, P.-L. Aublin, and R. Kapitza: "sgx-dl: Dynamic Loading and Hot-Patching for Secure Applications", Middleware 2021—the entire contents of which are hereby incorporated by reference herein]. Systems and methods for dynamic software updates with also data migration capabilities exist. For instance, systems like Ginseng [I. Neamtiu, M. Hicks, G. Stoyle, and M. Oriol: "Practical Synamic Software Updating for C", PLDI 2006—the entire contents of which are hereby incorporated by reference herein], UpStare [K. Makris and R. Bazzi: "Immediate multi-threaded dynamic software updates using stack reconstruction", ATC 2009—the entire contents of which are hereby incorporated by reference herein], or Kitsune [C. M. Hayden, K. Saur, E. K. Smith, M. Hicks, and J. S. Foster: "Kitsune: Efficient, General-Purpose Dynamic Software Updating for C", ACM TOPLAS 2014—the entire contents of which are hereby incorporated by reference herein] for dynamic software updates are specific to a programming language (e.g., C or C++) are more flexible but require a special compilation process that modifies and annotates the source code before producing the binary code.

Next, after the SM has received the notification that E has entered an updatable state, the SM blocks, at 706, any execution context switch to the enclave E. Furthermore, the SM proceeds by installing E's software update at 708 and measures the updated code, i.e., the SM computes $H_{code}$ (E). Afterwards, the SM resumes, at 710, the execution of the enclave E, i.e., execution context switches are not anymore blocked by the SM. However, permissions to shared memory regions are still not granted to E, except that ones that are only shared between E and the OS. That is, both E and the OS can acquire the lock to those memory regions.

Figure 8:
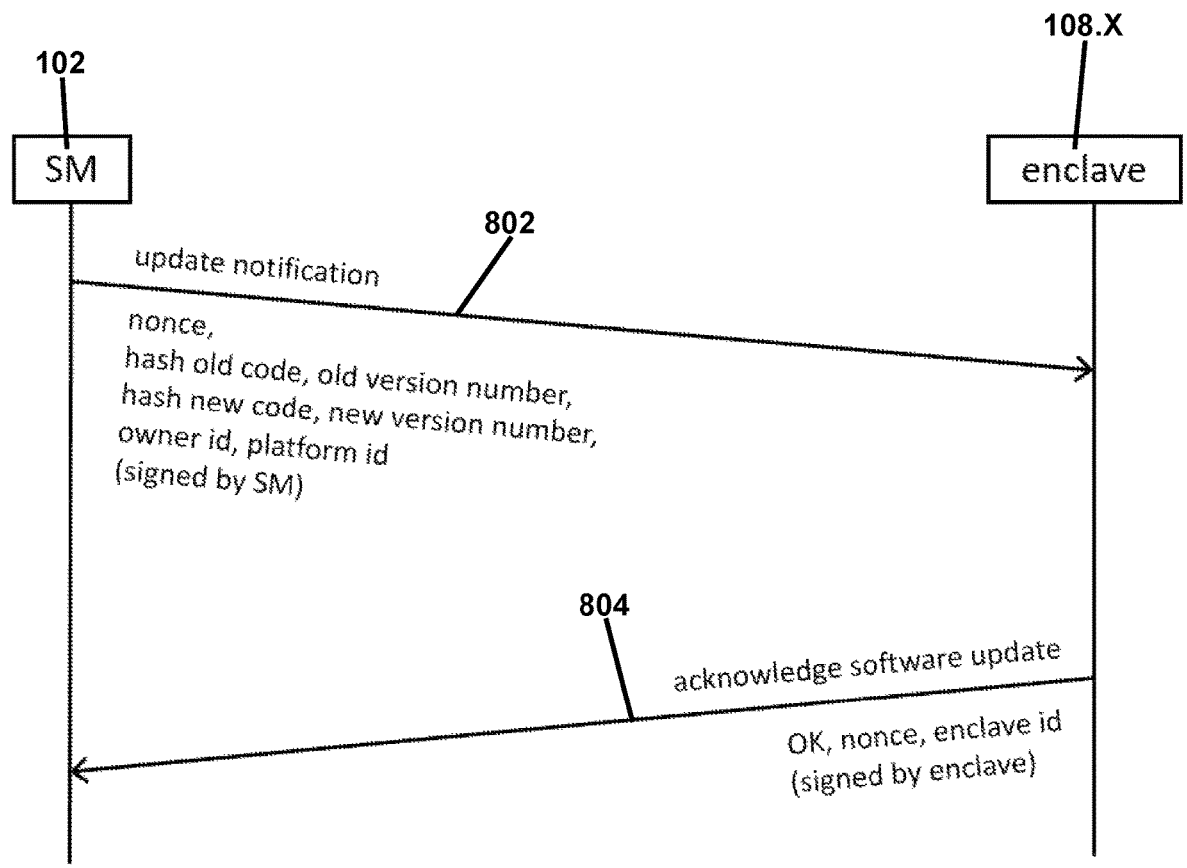
FIG. 8 illustrates a process by which a security monitor (SM) provides a notification of a software update of a respective enclave to entities that have shared memory regions with the respective enclave.

At 712, the SM informs all enclaves that have shared memory regions with E about the software update. FIG. 8 illustrates a process whereby the SM 102 informs enclaves that have shared memory regions with E about the software update. Specifically, the SM transmits, to the enclaves (e.g. enclave 108.X) that have shared memory regions with E, an update notification 802 that includes the old code measurement corresponding to the prior version of the software of E (e.g. a hash of the old code), the new code measurement corresponding to the updated version of the software of E (e.g. a hash of the new code), the versions numbers (e.g. the old version number and the new version number), the public key of the entity that published the software update (e.g. an owner ID), and possibly the CPU platform identifier (e.g. a platform ID) together with a nonce. The information is also signed by the SM. The SM waits for the enclaves to acknowledge the software update by sending an acknowledge software update 804 that includes an OK, a nonce, and an identifier of the enclave sending the acknowledgement (e.g. an enclave ID). The information is also signed by the enclave. If all enclaves besides E of a shared memory region have acknowledged the software update, the SM permits E to again access the shared memory region at 714, i.e., E can acquire the lock of the shared memory region. This technique for updating the code of an enclave is valid irrespective of the existence of shared memory regions. If the updated enclave does not share any memory region with other enclaves there is no need of notifying enclaves about the update and the SM will immediately grant permissions to the updated enclave when it requests them. That is, when not sharing any memory regions with other enclaves, the update process is the same as depicted in FIG. 7, but the last two stages are omitted.

The above described process minimizes the downtime of an enclave when installing a software update. The execution of the updated enclave E is only blocked while the software update is installed. As soon as the new software is installed and measured, E is allowed to run again. However, E's access to shared memory regions is limited as the trust relation between E and sharing enclaves must first be renewed. Since the OS is untrusted, there is no need to renew the trust relation between E and the OS. Furthermore, other enclaves are not blocked by the software update. In particular, while E is updated, they can still access the shared memory regions. Multiple enclaves can be updated at the same time.

Variants:

In case the update increases the enclave's binary size and there is not sufficient space within the memory region protected by the PMP for the enclave code, the following steps can be taken to install the software update. These steps are executed after the enclave enters in the "updatable state" (cf. FIG. 7). If there is free memory space contiguous to the respective "code PMP entry" assigned to the enclave, the SM requests the OS to enlarge the memory region for installing the new binary. If the OS is able to extend the memory region, the SM changes the memory boundaries of the PMP entry accordingly and proceeds with the installation as described in FIG. 7. If, however, there is not enough contiguous memory available, the SM requests the OS for a new memory region large enough for the update. Once assigned, the SM protects it with a corresponding PMP entry. The SM then copies the code from the original region to the new region and updates it. In this case, and assuming virtual memory, the virtual addresses of the program do not need to be changed, but the page table that holds the required information for the translation from virtual to physical addresses must be updated so it refers to the new physical memory region. For example, if the virtual address 0x0043 maps to region 1 in the page table, after copying the code to the new location, the virtual address 0x0043 must map to the "new location". Note that the enclave's data regions might also be copied to a new region for convenience (the page tables must then also be updated). Finally, the SM releases the original memory regions back to the OS and continues with resuming the execution of the enclave (cf. again FIG. 7).

The enclave E may communicate (over a secure channel) with an external entity X. This entity can, e.g., be an enclave running on another (untrusted) computer or an OS application on another (trusted) computer. If E's software is updated, X should also be notified and acknowledge the update. We assume that for the communication between E and X, E uses as shared memory region R, which the OS can also access. However, for protecting the data in this memory region, the data is encrypted with a key shared between E and X. Note that the OS must be able to access R because the OS will send and receive the network packets with the encrypted data for the communication between E and X.

When this shared memory region R is created, the SM keeps record that R is used for the communication with an external trusted entity. After updating E, the SM will not immediately grant E permissions to access R. Instead, the SM will notify X about the update and wait for X's acknowledgement of the update. For this, the SM must maintain information about X, e.g., its IP address. When establishing the communication between E and X over the shared memory region R, the SM obtains this information from E. Furthermore, since X must be able to check the integrity of the notification of the software update, X must have access to the public key of the SM. Again, this information is exchanged when establishing the communication between E and X. Note that the OS can be malicious and block messages to X or from X, e.g., the notification about the software update or its acknowledgement. This relates to a denial of service. However, the OS can already achieve a similar result by not giving the execution context to E and preventing E to make progress.

Current TEE instantiations such as Intel SGX do not offer runtime attestation and the peers or the enclave developer can only verify that some concrete code was launched. Because methods—according to aspects of the present disclosure—split the enclave into a code and data regions, independent hashes can be computed that represent the current identity of the enclave and its current state. In particular, for installing software updates, the current identity of an enclave can be used, namely, $H_{code}$ (E). Analogously to $H_{code}$(E), $H_{data}$ (E) denotes the measurement (hash) of the data of the enclave E, excluding the memory regions that are shared with others enclaves or the OS. Furthermore, H(R) denotes the measurement (hash) of the shared memory region R. As $H_{code}$ (E), the SM can also easily compute $H_{data}$ (E) and H(R). These measurements (hashes) can be used to attest whether an enclave has correctly loaded a state, without knowing the hash of the enclave code. Analogously, an entity can attest the content of a shared memory region separately, e.g., after a reset, independent to the enclaves that have access to the shared region.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for implementing a software update for a selected enclave of a computing system, the method comprising:
    obtaining, by a security monitor (SM) of the computing system, the software update for the selected enclave;
    installing, by the SM, the software update for the selected enclave to provide updated enclave software code;
    measuring, by the SM, the updated enclave software code to provide a software update measurement, wherein the updated enclave software code is stored in a memory region isolated from a memory region in which data for the selected enclave is stored; and
    transmitting, by the SM, the software update measurement to one or more respective other enclaves that share a memory region with the selected enclave.

2. The method according to claim 1, wherein the SM is a firmware component that provides for low-level control of the physical memory of the computing system.

3. The method according to claim 1, wherein the SM provides read, write, and execute permissions to the memory region in which the updated enclave software code is stored, to the memory region in which data for the selected enclave is stored, and to the shared memory regions.

4. The method according to claim 3, wherein the memory region in which the updated enclave software code is stored is write-protected such that only the SM can perform modifications of the memory region in which the updated enclave software code is stored.

5. The method according to claim 1, wherein the memory region in which the updated enclave software code is stored, the memory region in which the data for the selected enclave is stored, and the shared memory regions each has a separate physical memory protection (PMP) entry.

6. The method according to claim 1, further comprising:
    before installing the software update for the selected enclave, verifying, by the SM, the integrity of the software update.

7. The method according to claim 6, wherein verifying the integrity of the software update includes one or more of:
    a signature check of the software update,
    a check that a hash of old code included in the software update matches code currently running inside the selected enclave,
    a check of a platform identifier in the software update.

8. The method according to claim 1, further comprising:
    before installing the software update for the selected enclave, instructing, by the SM, the selected enclave to enter an updatable state.

9. The method according to claim 8, wherein instructing the selected enclave to enter the updatable state includes instructing the selected enclave to release any lock on any of the shared memory regions.

10. The method according to claim 8, further comprising:
    receiving, by the SM, a notification that the selected enclave has entered the updatable state; and then
    blocking, by the SM, execution context switches to the selected enclave until after the software update has been installed.

11. The method according to claim 1, further comprising:
    before installing the software update for the selected enclave, blocking, by the SM, any execution context switch to the selected enclave.

12. The method according to claim 11 wherein transmitting the software update measurement to one or more respective other enclaves that share a memory region with the selected enclave includes additionally transmitting, by the SM, one or more of:
    an old code measurement corresponding to a prior version of the enclave software code,
    a version number of the updated enclave software code,
    a version number of the prior version of the enclave software code,
    a public key of an entity that published the software update,
    a CPU platform identifier.

13. The method according to claim 1, further comprising:
    before installing the software update for the selected enclave, blocking, by the SM, access to the shared memory regions.

14. The method according to claim 13, further comprising:
    after transmitting the software update measurement to the one or more respective other enclaves that share a memory region with the selected enclave, unblocking, by the SM, access to the shared memory regions after receiving an acknowledgment of the software update from the one or more respective other enclaves.

15. The method according to claim 1, further comprising attesting, by the SM, the selected enclave by measuring a state of the selected enclave using the data for the selected enclave stored in the memory region that is isolated from the memory region that stores the updated enclave software code.

16. The method according to claim 1, wherein the method is performed dynamically at runtime of the selected enclave.

17. The method according to claim 1, wherein the SM is trusted by the selected enclave and the one or more respective other enclaves, wherein an operating system of the selected enclave and the one or more respective other enclaves are untrusted, and wherein the enclaves do not trust each other.

18. A system for implementing a software update for a selected enclave of a computing system, the system comprising:
    processing circuitry configured to:
        obtain the software update for the selected enclave;
        install the software update for the selected enclave to provide updated enclave software code; and
        measure the updated enclave software code to provide a software update measurement, wherein the updated enclave software code is stored in a memory region isolated from a memory region in which data for the selected enclave is stored; and
        transmit, by the SM, the software update measurement to one or more respective other enclaves that share a memory region with the selected enclave.

19. A tangible, non-transitory computer-readable medium having instructions thereon which, upon being executed by one or more hardware processors, alone or in combination, provide for execution of a method for implementing a software update for a selected enclave of a computing system, the method comprising:
    obtaining, by a security monitor (SM) of the computing system, the software update for the selected enclave;
    installing, by the SM, the software update for the selected enclave to provide updated enclave software code; and
    measuring, by the SM, the updated enclave software code to provide a software update measurement, wherein the updated enclave software code is stored in a memory region isolated from a memory region in which data for the selected enclave is stored; and transmitting, by the SM, the software update measurement to one or more respective other enclaves that share a memory region with the selected enclave.

\* \* \* \* \*